United States Patent [19]

Drewitz

[11] Patent Number: 5,782,339
[45] Date of Patent: Jul. 21, 1998

[54] ADJUSTABLE GUIDE-RAIL FOR A CONVEYOR BELT

[76] Inventor: Hugues Drewitz, 113, 45th Avenue, St-Eustache, Quebec J7P 3G4, Canada

[21] Appl. No.: 744,757

[22] Filed: Nov. 6, 1996

[51] Int. Cl.⁶ .................................................. B65G 21/20
[52] U.S. Cl. ........................................................ 198/836.3
[58] Field of Search .............................. 198/836.1, 836.3

[56] References Cited

U.S. PATENT DOCUMENTS

| | | | |
|---|---|---|---|
| 5,322,160 | 6/1994 | Markiewicz et al. | 198/836.3 |
| 5,335,782 | 8/1994 | Herzog | 198/836.3 |

FOREIGN PATENT DOCUMENTS

| | | | |
|---|---|---|---|
| 2544292 | 10/1984 | France | 198/836.3 |
| 3445426 | 6/1986 | Germany | 198/836.3 |

*Primary Examiner*—James R. Bidwell
*Attorney, Agent, or Firm*—Ratner & Prestia

[57] ABSTRACT

The invention relates to an adjustable guide rail mounted to the sides of a conveyor belt for guiding containers transported on the conveyor belt. The guide rail includes a quick adjustment system allowing ready alignment of the full length of the rail to a desired position. More specifically, the adjustment system comprises a rotatable gage block with a series of holes of variable depth capable of receiving a fixed pin to position the rail at a predetermined spacing on the conveyor belt determined by the depth of the selected hole.

13 Claims, 5 Drawing Sheets

5,782,339

1

ADJUSTABLE GUIDE-RAIL FOR A CONVEYOR BELT

FIELD OF THE INVENTION

The present invention relates to a guide rail that can be mounted to the side of a conveyor belt and easily adjusted to a desired position in accordance with the transverse dimension of the containers transported on the conveyor belt. A distinguishing feature of the guide rail resides in the provision of a gage block that allows the guide rail to be set quickly at a predetermined position on the conveyor belt without the need of tools.

BACKGROUND OF THE INVENTION

In the Container industry, conveyor belt systems are extensively used to transport containers along various container processing stations. Typically, a conveyor belt is designed wide to accommodate large containers, however, in instances where small containers are transported, guide rails are provided on the sides of the conveyor to ensure that the containers will remain in line along the path of travel established by the conveyor belt. Keeping the containers in alignment on the conveyor belt is important because container handling devices such as star wheels or turrets can then accurately register with individual containers.

The guide rails that are commonly used in the industry can be adjusted to a desired position by using simple manually operated knobs. To perform the adjustment procedure, the operator releases the knobs, positions the guide rail at a desired position and then tightens the knobs to lock the guide rail in place.

Conventional adjustable guide rails, however, fail to provide a quick and easy means of aligning the rail along the full length of the conveyor. Usually, the operator adjusts the guide rail by eye or with the help of an external measuring device. In instances where the conveyor system is long, this procedure is time consuming and often does not provide consistent or accurate positioning.

Thus there is a need in the industry to provide a guide rail for a conveyor belt that can be readily adjusted to a desired position without the need of tools.

OBJECTIVES AND STATEMENT OF THE INVENTION

It is a general object of the invention to provide a guide rail for a conveyor belt that can be adjusted quickly and with precision without the use of tools.

As embodied and broadly described herein, the invention provides an adjustable guide rail for guiding containers on a conveyor belt, said adjustable guide rail comprising:

a support element;

an elongated rail element mounted to said support element and being movable with relation to said support element;

a gage block member having a plurality of bores of different depths in a spaced apart relationship;

a stopper member capable of selectively penetrating in any one of said bores;

a locking mechanism for securing said rail element at a given horizontal distance from said support element, said locking mechanism allowing, in a free position, the free movement of said elongated rail element with relation to said support, and in a locked position, the securing of said elongated rail element, whereby movement of said rail with relation to said support element causes relative displacement between said gage block and said stopper element, engagement of said stopper member in a selected bore of said gage block allowing location of said elongated rail element at a predetermined distance with relation to said support element.

In a preferred embodiment, the guide rail comprises a support element that includes a vertical support stand and a lock mechanism. The vertical support stand comprises a slot that receives the lock mechanism and provides a range within which the lock mechanism can move in a vertical direction. The lock mechanism comprises a head and a threaded shank that extends perpendicularly therefrom. The threaded shank is inserted through the slot of the support stand while the head abuts the outer surface of the support stand. A height adjustment knob is fastened onto the portion of the threaded shank that protrudes through the slot to force the head portion of the lock mechanism against the surface of the support stand and secure the lock mechanism at the desired vertical position. Moreover, the lock mechanism includes an aperture that extends horizontally through the longitudinal axis of the head and threaded shank to receive a guide rod on which is mounted the elongated rail element. A thumb screw passing through the head of the lock mechanism secures the guide rod in a desired horizontal position.

A distinguishing feature of the guide rail resides in the provision of an adjustment mechanism that comprises a gage block and a pin. The pin is fixed to a plate attached to the lock mechanism. The gage block is rotatably mounted onto the guide rail and comprises a series of cavities of variable depth for selectively receiving the pin. Moving the guide rod and accompanying gage block toward the pin allows the pin to penetrate into the cavity so as to readily position the guide rail at a predetermined spacing on the conveyor belt determined by the depth of the selected cavity.

Advantageously, every cavity in the gage block can be provided with identification marks so as to visually identify the position of the guide rail corresponding to the cavity.

DESCRIPTION OF A PREFERRED EMBODIMENT

Figure 1:
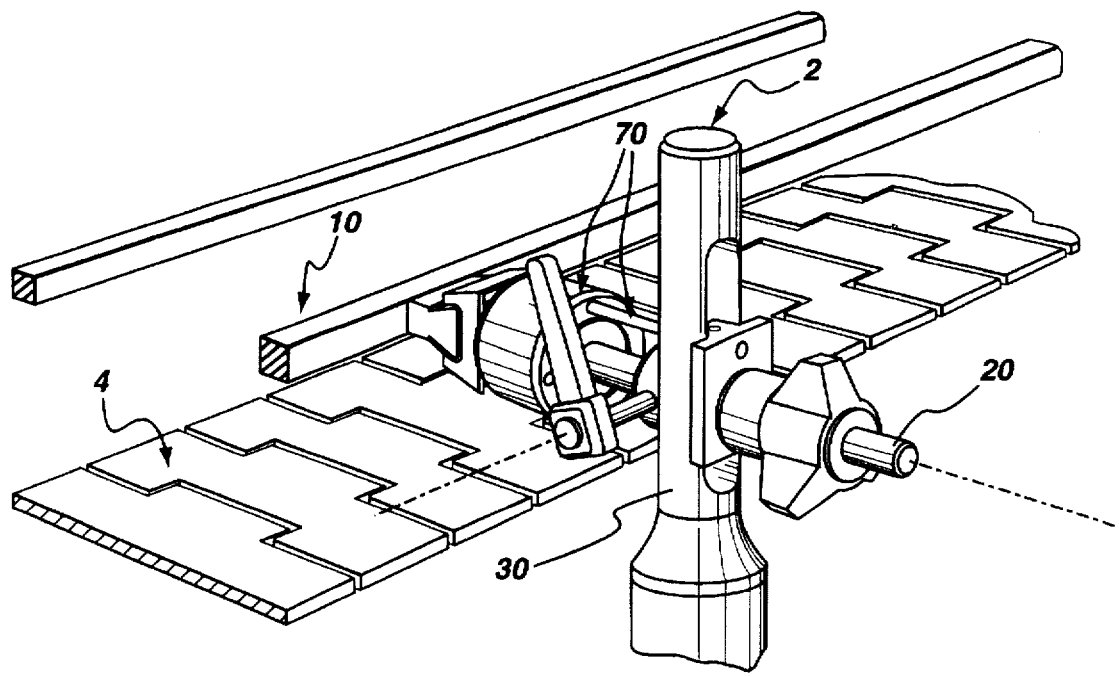
FIG. 1 is a perspective view of the adjustable guide rail in accordance with the present invention.

Referring now to the drawings, FIG. 1 illustrates an adjustable guide rail 2 that can be installed along the sides of a conveyor belt 4. Broadly stated, the adjustable guide rail comprises an elongated rail element 10 and a supporting and adjusting structure including a guide rod 20 mounted to tho elongated rail element 10, an adjustment system 70 and a support element 30 that carries the entire guide rail structure. Normally, the conveyor belt as seen in FIG. 1 is provided with two guide rails, one on either side of the conveyor to establish a channel that regulates the motion or containers on the conveyor belt by always keeping the containers precisely in line. Since the two guide rails are identical, the following description will focus on a single unit. It should also be appreciated that a single rail element will need at least two supporting and adjusting structures, one near each extremity of the rail element. If the rail element is long, additional supporting and adjusting structures may be required, located at intermediate sites between the end portions of the rail element.

Figure 2:
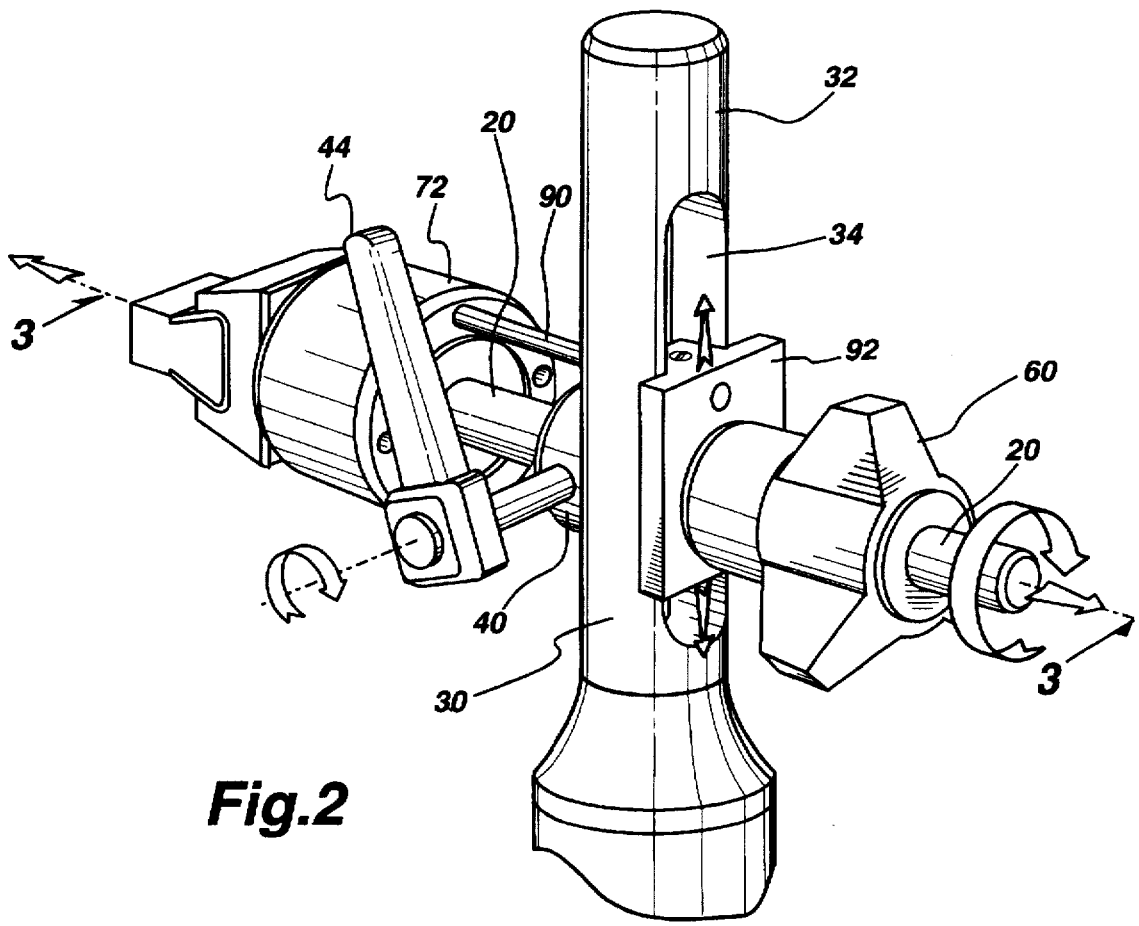
FIG. 2 is an enlarged perspective view of the guide rail showing the different adjustments that can be performed to locate the guide rail in a predetermined position with relation to the conveyor belt.

The support element comprises two members, namely a vertical support stand 32 and a locking mechanism 40. As best shown in FIG. 2, the vertical support stand 32 is a rod with a circular cross sectional shape having an elongated slot 34 that extends along the longitudinal axis of the rod. The elongated slot 34 provides a range within which the guide rail 2 can adjust vertically. The support stand 32 is preferably made of stainless steel to provide a sturdy support structure.

Figure 3:
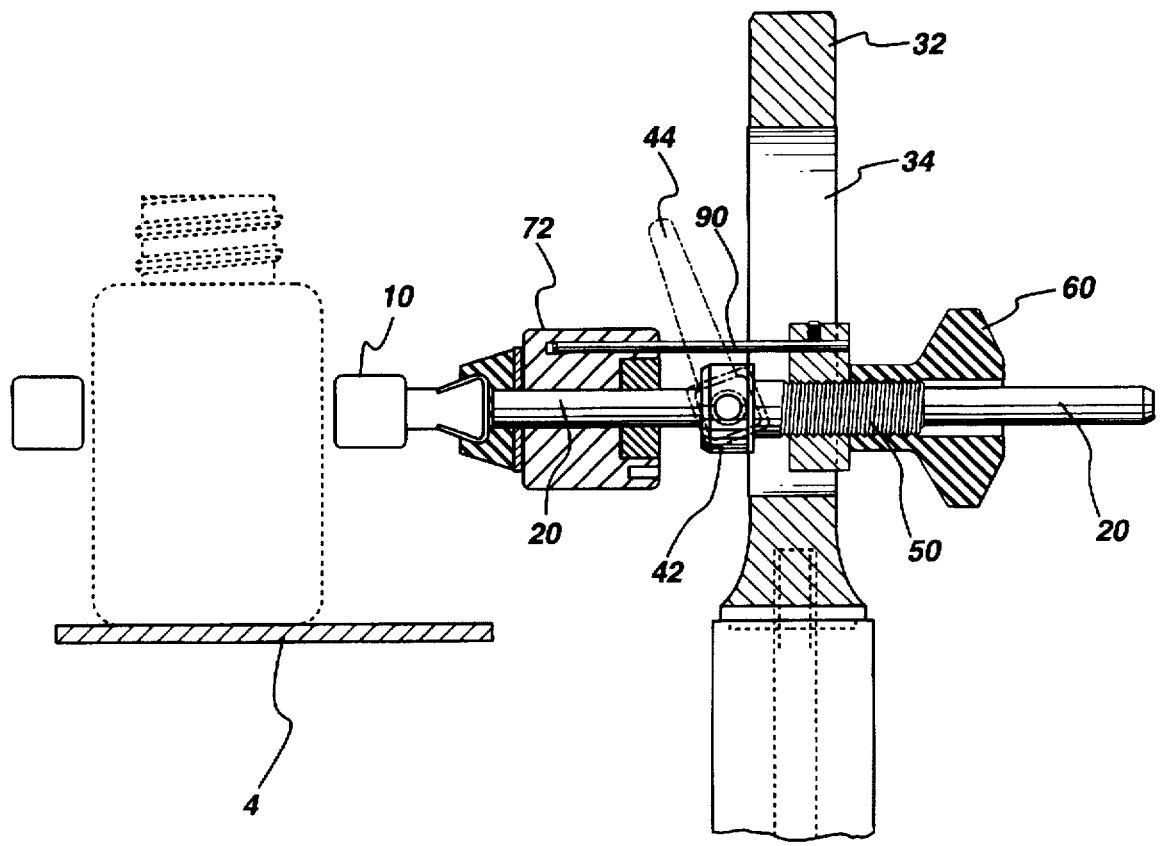
FIG. 3 is a cross-sectional view taken along the line 3—3 in FIG. 2.

As best shown in FIG. 3, the lock mechanism 40 is a bolt-like structure including a head 42 and shank 50. The head 42 is a cylindrical member that engages the outer surface of support stand 32. An adjustment knob 60 is threadedly engaged on the shank 50. When the knob 60 is tightened the head 42 abuts against the support stand 32 to lock the bolt-like structure at the desired vertical position.

Figure 4:
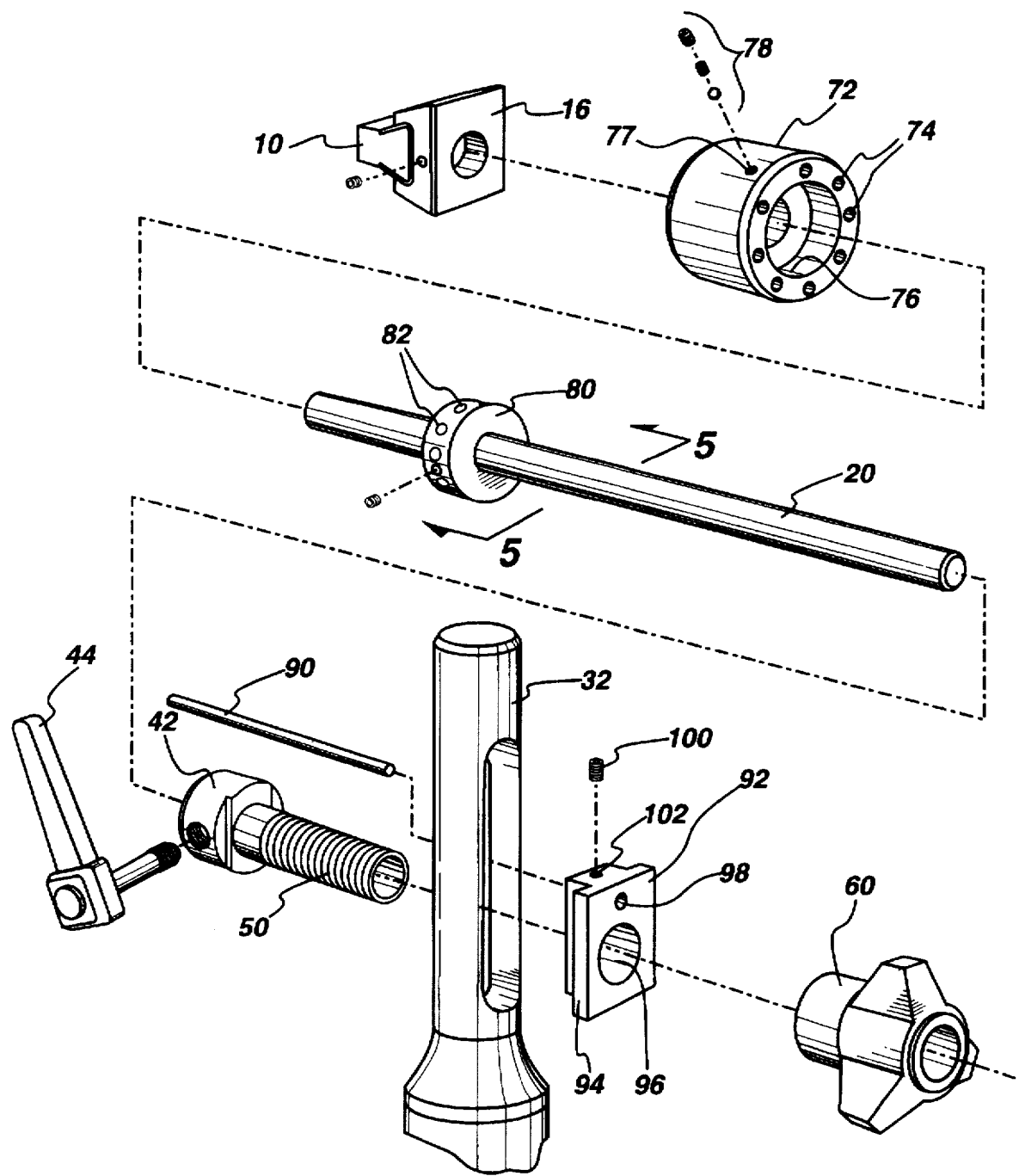
FIG. 4 is an exploded perspective view of the adjustable guide rail.

The elongated rail element 10 is secured to the stand 32 by the guide rod 20 that is slidingly mounted through a central hole of the bolt-like structure 40. To lock the guide rod 20 against displacement in the bolt-like structure 40 a thumb screw 44 is provided, mounted to the head 42 to create a frictional engagement with the outer surface of the rod. This feature is best shown in FIG. 4. The thumb screw 44 is threadedly engaged in the head 42. When the thumb screw is tightened it projects in the aperture that receives the guide rod 20 and engages the guide rod 20 to prevent it from moving. To release the guide rod 20, the thumb screw is turned in the other direction so it retracts from the aperture and allows the guide rod 20 to slide therein. The movement of the guide rod 20 with relation to the support stand 32 allows it location of the rail element 10 in the desired horizontal position with relationship to the companion rail element (the rail element on the other side of the conveyor) to establish the desired spacing between them.

The adjustment system 70 includes a cylindrical gage block 72 rotatably mounted on the guide rod 20, The gage block 72 comprises a series of cavities or bores 74 of variable depth that can be selectively aligned with a stopper member in the form of a pin 90 to locate the elongated rail element 10 at a position relative to the support stand that is determined by the length of the pin 90 and the depth of the cavity 74 in which the pin is received.

Figure 5:
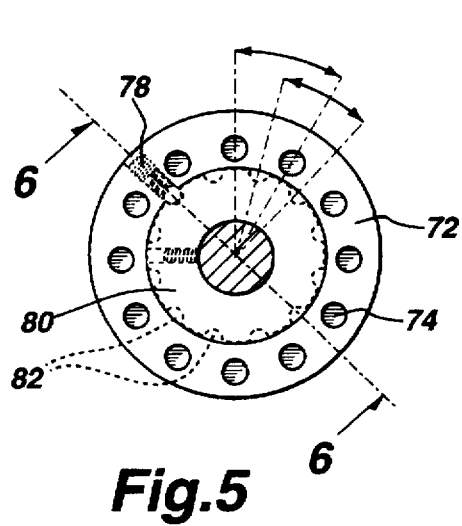
FIG. 5 is a cross section taken along the line 5—5 in FIG. 4.
Figure 6:
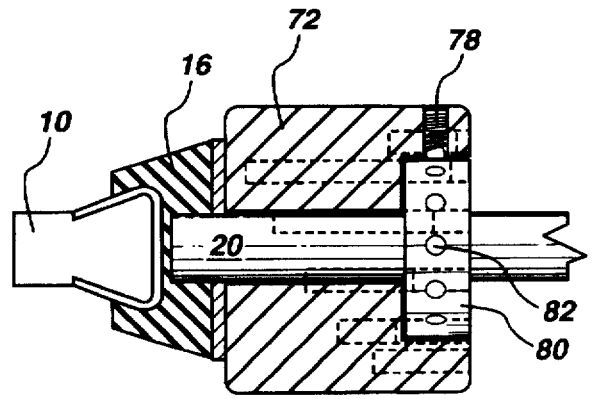
FIG. 6 is cross section taken along the line 6—6 in FIG. 5.

The gage block, as illustrated in FIGS. 4 and 5, includes a counter bore 76 and a ball detent 78 mounted in an aperture 77 drilled between two adjacent cavities 74. The ball detent 78 projects out from within the surface of counter bore 76. A collar 80 is fitted into the counter bore 76. The collar 80 is fixed onto the guide rod 20 so as to seat the gage block against rail clamp 16 and prevent it from sliding on the guide rod 20. The collar 80 includes a series of shallow recesses 82 along its outer periphery so as to selectively receive the ball detent 78.

As shown in FIG. 5, the angular distance between successive recesses 82 is the same as the distance between adjacent cavities 74. Moreover, the angular position of the shallow recesses 82 on the collar 80 is such that when the ball detent 78 is located in a given recess 82, a cavity 74 of the gage block 72 registers with the pin 90 so the pin 90 can be inserted in that particular cavity 74. The ball detent 78 thus provides a quick and easy registration system allowing rapid alignment of the pin 90 with a selected cavity 74 of the gage block 72. As well known to those skilled in the art, the ball detent 78 includes a spring biased ball that when engaged in a shallow recess 82 will prevent the gage block 72 from freely rotating. To turn the block to the next angular position, a sufficient force must be applied to cause the ball to compress the spring and thus escape from the recess.

As best seen in FIGS. 3 and 4, the pin 90 is mounted to a support plate 92 shaped so as to fit partially into the slot 34 of support stand 32 while a flanged portion 94 rests against the outer surface of the support stand 32. The support plate 92 comprises an aperture 96 for receiving shank 50 and a second smaller aperture 98 in which the pin 90 is secured by a screw 100 tightened through a drilled hole 102 that opens in aperture 98.

Figure 7:
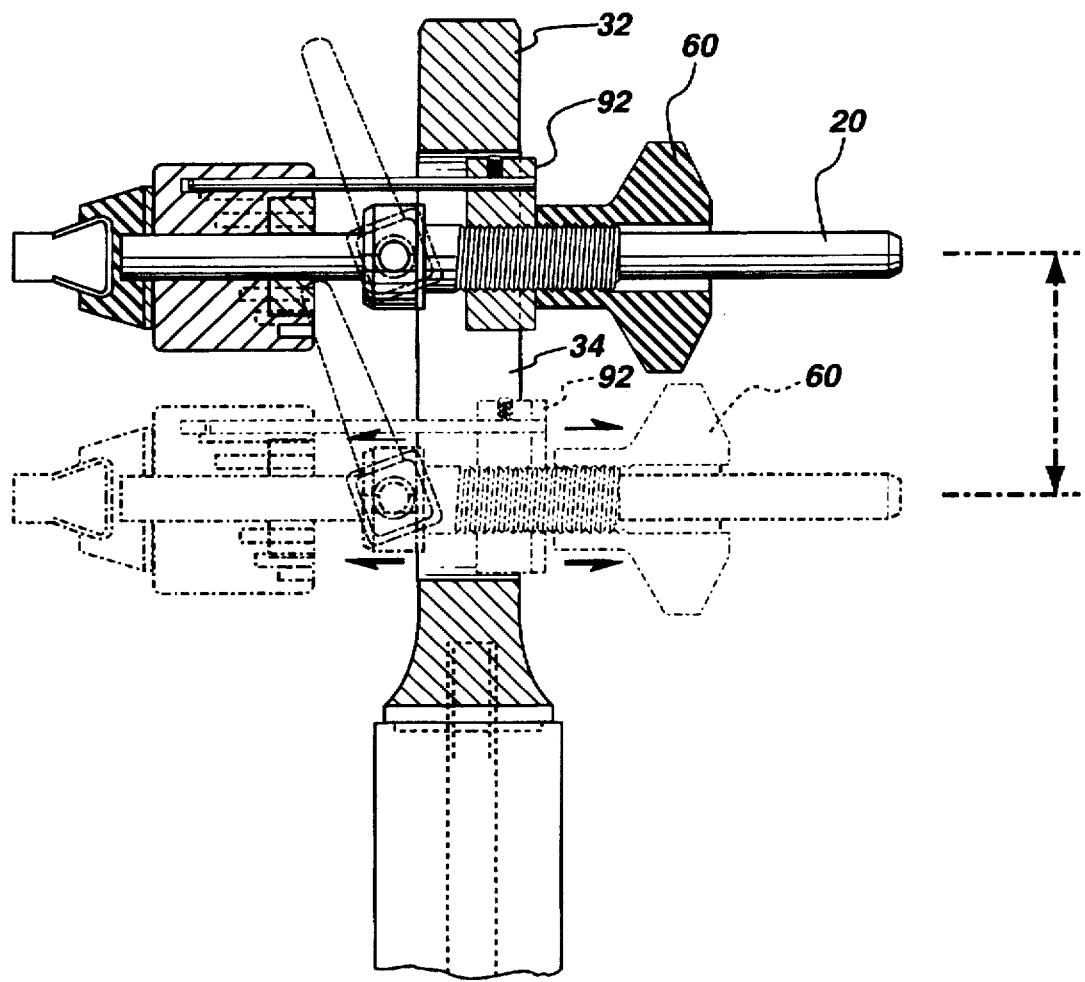
FIG. 7 is a vertical cross-sectional view of the guide rail, depicting the vertical adjustment capability of the rail.
Figure 8:
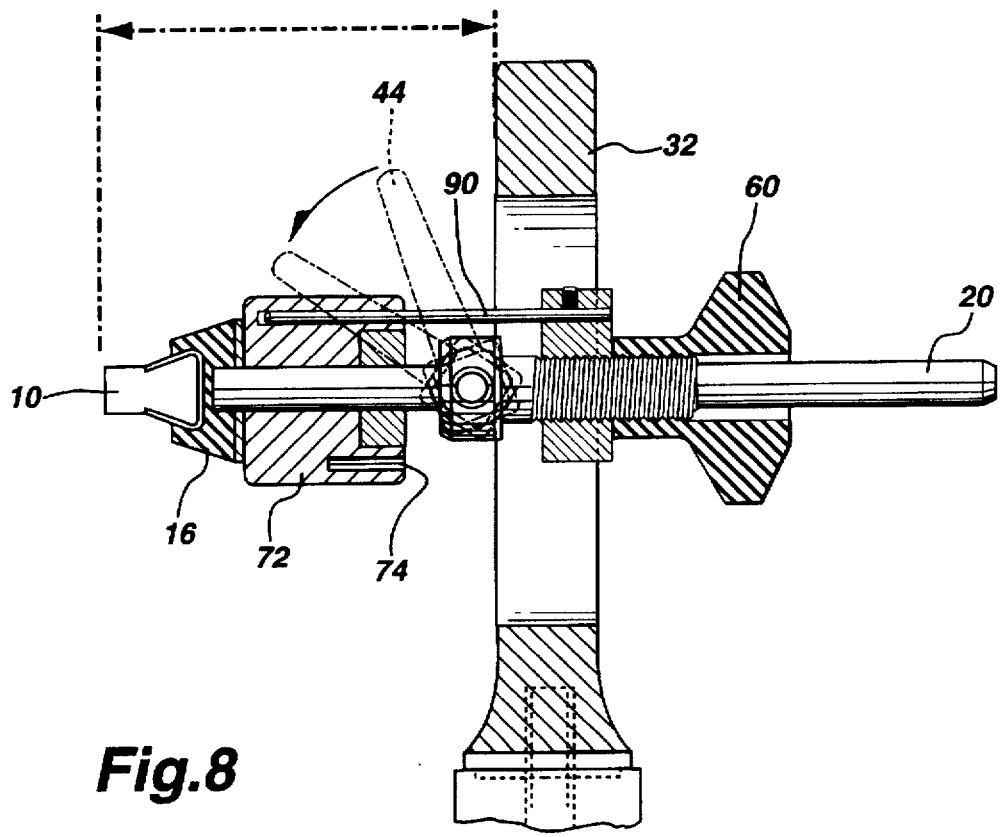
FIGS. 8 and 9 are vertical cross-sectional views of the guide rail, depicting the horizontal adjustment capability of the rail.
Figure 9:
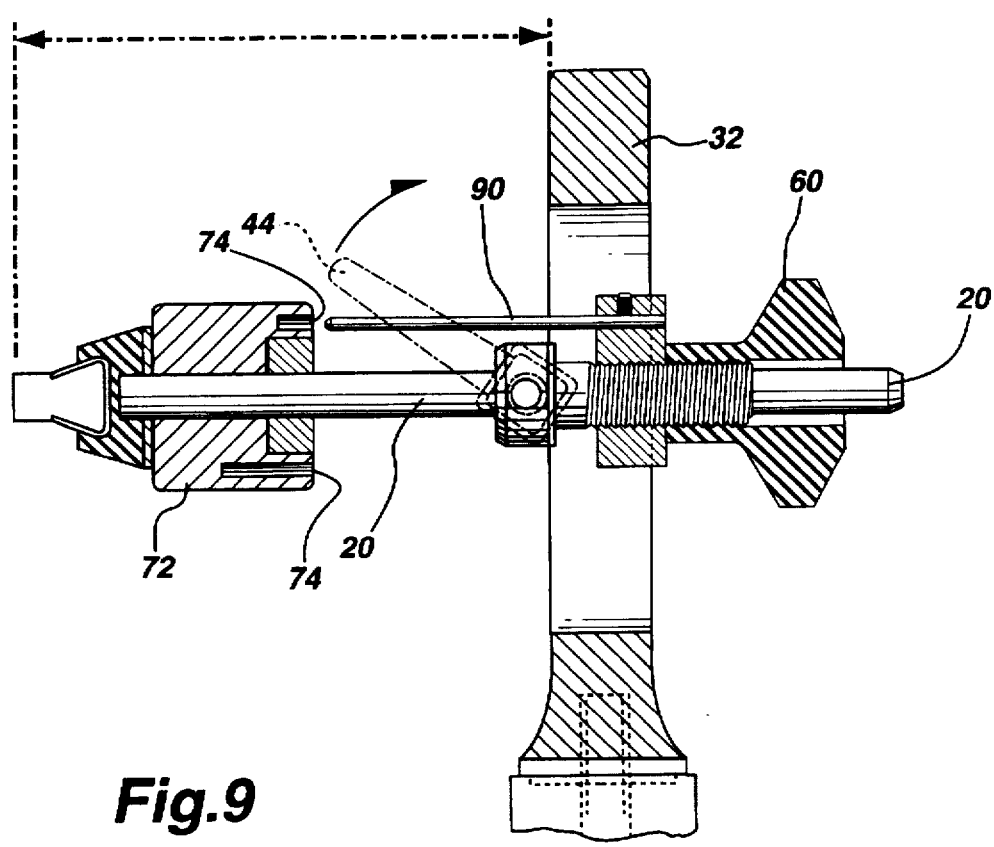

In operation, the height of tho adjustable guide rail can be set by loosening the height adjustment knob 60, displacing the support plate 92 along with the guide rod 20, and then tightening the knob 60 when the desired vertical position has been reached. The vertical adjustment capability of the guide rail is illustrated in FIG. 7. To adjust the guide rail horizontally, thumb screw 44 is released to allow guide rod 20 to slide in the lock mechanism 40. The elongated rail element is pulled to disengage pin 90 from the cavity 74 of gage block 72 in which it is received. The gage block 72 is rotated until the selected cavity aligns with pin 90. The elongated rail element is then moved toward support stand 32 such that pin 90 penetrates fully cavity 74. The thumb screw 44 is tightened to lock the guide rod 20 against any horizontal displacement. The horizontal adjustment capability of the guide rail is illustrated in FIGS. 8 and 9.

The above description of the preferred embodiment should not be interpreted in any limiting manner since variations and refinements are possible which are within the spirit and scope of the present invention. The scope of the invention is defined in the appended claims and their equivalents.

I claim:

1. An adjustable guide rail for guiding containers on a conveyor belt, said adjustable guide rail comprising:

a support element;

an elongated rail element mounted to said support element and being movable with relation to said support element;

a gage block having a plurality of bores of different depths in a spaced apart relationship;

a stopper member having a pin adapted to selectively penetrate into any one of said plurality of bores;

a locking mechanism for securing said rail element at a given horizontal distance from said support element, said locking mechanism allowing, in a free position, the free movement of said rail element with relation to said support element and, in a locked position, securing said rail element;

said bores of said gage block and said pin being arranged along a common, substantially horizontal axis;

whereby movement of said rail element with relation to said support element causes relative displacement between said gage block and said stopper member, engagement of said pin in a selected bore of said gage block allowing location of said rail element at a predetermined distance with relation to said support element.

2. An adjustable guide rail as defined in claim 1 further comprising a guide rod on which said gage block is mounted, said guide rod arranged along said common axis and said locking mechanism allowing, when in said free position, a sliding motion of said guide rod along said axis.

3. An adjustable guide rail as defined in claim 2, wherein said locking mechanism includes a shank in which said guide rod is slidingly mounted and a thumb screw adapted to engage said guide rod.

4. An adjustable guide rail as defined in claim 1, wherein said gage block is movable with relation to said pin along said common axis, allowing said pin to penetrate a selected bore of said gage block.

5. An adjustable guide rail as defined in claim 1, wherein said gage block moves angularly about said common axis and includes a detent mechanism adapted to retain said gage block in any one of a plurality of angular positions, in each one of said angular positions said pin penetrating a different one of said bores.

6. An adjustable guide rail as defined in claim 2, wherein said rail element is mounted to said guide rod, said guide rod being mounted to said locking mechanism and said locking mechanism being mounted to said support element.

7. An adjustable guide rail for guiding containers on a conveyor belt, said adjustable guide rail comprising:

a support element;

an elongated rail element mounted to said support element and being movable with relation to said support element;

a gage block having a plurality of bores of different depths in a spaced apart relationship;

a stopper member adapted to selectively penetrate into any one of said plurality of bores;

a locking mechanism for securing said rail element at a given horizontal distance from said support element, said locking mechanism allowing, a free position, the free movement of said rail element with relation to said support element and, in a locked position, securing said rail element;

whereby movement of said rail element with relation to said support element causes relative displacement between said gage block and said stopper member, engagement of said stopper member in a selected bore of said gage block allowing location of said rail element at a predetermined distance with relation to said support element.

8. An adjustable guide rail as defined in claim 7, further comprising a guide rod on which said gage block is mounted, said locking mechanism allowing, when in said free position, a sliding motion of said guide rod.

9. An adjustable guide rail as defined in claim 7, wherein said gage block is adapted to move with relation to said stopper member, allowing said stopper member to penetrate a selected bore of said gage block.

10. An adjustable guide rail as defined in claim 8, wherein said locking mechanism includes a shank in which said guide rod is slidingly mounted and a thumb screw adapted to engage said guide rod.

11. An adjustable guide rail as defined in claim 7, wherein said gage block moves angularly and includes a detent mechanism adapted to retain said gage block in any one of a plurality of angular positions, in each one of said angular positions said stopper member penetrating a different one of said bores.

12. An adjustable guide rail as defined in claim 7, wherein said rail element is mounted to said guide rod, said guide rod being mounted to said locking mechanism and said locking mechanism being mounted to said support element.

13. An adjustable guide rail for guiding containers on a conveyor belt, said adjustable guide rail comprising:

a support element;

an elongated rail element mounted to said support element and being movable with relation to said support element;

a gage block having a plurality of bores of different depths in a spaced apart relationship;

a stopper member having a pin capable of selectively penetrating into any one of said plurality of bores;

a locking mechanism for securing said rail element at a given horizontal distance from said support element;

whereby said plurality of bores of said gage block and said pin are arranged along a common, substantially horizontal axis and movement of said rail element with relation to said support element causes relative displacement between said gage block and said stopper member, engagement of said pin in a selected bore of said gage block allowing location of said rail element at a predetermined distance with relation to said support element.

* * * * *